United States Patent [19]
Schweitzer, III et al.

[11] Patent Number: 5,477,408
[45] Date of Patent: Dec. 19, 1995

[54] SYSTEM FOR DETECTING CERTAIN ERRONEOUS FAULT-INDICATING DATA IN A PROTECTIVE RELAY FOR POWER SYSTEMS

[75] Inventors: Edmund O. Schweitzer, III, Pullman, Wash.; Timothy P. Tibbals, Moscow, Id.

[73] Assignee: Schweitzer Engineering Labs, Inc., Pullman, Wash.

[21] Appl. No.: 98,841

[22] Filed: Jul. 29, 1993

[51] Int. Cl.⁶ .................................................. H02H 3/08
[52] U.S. Cl. .............................. 361/63; 361/78; 361/87
[58] Field of Search .................................. 361/93, 63, 78, 361/83, 80, 79, 96, 31

[56] References Cited

U.S. PATENT DOCUMENTS 4,446,498  5/1984  Stich ........................................ 361/87
4,825,326  4/1989  Andow et al. ............................ 361/63

Primary Examiner—Marc S. Hoff
Assistant Examiner—S. Jackson
Attorney, Agent, or Firm—Jensen & Puntigam

[57] ABSTRACT

The system includes a blocking counter which is set to 255 quarter cycles and the output contacts of the protective relay are blocked for five quarter cycles if the first order difference between two successive quarter-cycle samples of current is above a selected threshold, referred to as the last previous and the first samples. The first order difference between the first and the next successive (second) samples is compared against a second threshold and the instantaneous value of the current sample is compared against the second threshold. If both comparisons are above the second threshold, then the output contacts are unblocked. If not, such that a constant DC A/D converter output or an A/D spike is indicated, then the outputs remain blocked for the full five quarter cycles, which is sufficient time to permit the A/D spike to disappear and to recognize a constant DC output from the A/D converter.

12 Claims, 1 Drawing Sheet

SYSTEM FOR DETECTING CERTAIN ERRONEOUS FAULT-INDICATING DATA IN A PROTECTIVE RELAY FOR POWER SYSTEMS

TECHNICAL FIELD

This invention relates generally to protective relays for power systems and more specifically concerns a system useful in a protective relay for ascertaining certain kinds of erroneous data which might otherwise lead to an incorrect indication of a fault on the power system.

BACKGROUND OF THE INVENTION

Protective relays are used at various points in power transmission and distribution systems to identify faults and to actuate a circuit breaker covering the portion of the system encompassing the fault, until the fault is cleared. In recent years, computer-type relays using microprocessors have become increasingly popular and are now widely used. In such relays, the voltage and current signals on the power line are sampled. These signal samples are then applied through transformers and low pass filters and then a multiplexer. The multiplexed signals are then applied to an A/D converter and from there are applied to a microprocessor, which compares various actual characteristics of the signals against selected standard values of those characteristics to ascertain fault conditions. The general operation of such relays is well known in the art.

While such relays are ordinarily extremely reliable, certain portions of the relay, such as for instance the A/D converter, can malfunction in various ways. When the resulting signals are processed by the microprocessor, they could erroneously appear to be indicative of a fault condition on the power system. This could result in an incorrect trip of the circuit breaker, interrupting power to a portion of the power system, which is very undesirable.

In the present invention, two possible sources of erroneous data are identified and the erroneous signals are prevented from producing a trip output signal which in turn would actuate a circuit breaker.

DISCLOSURE OF THE INVENTION

Accordingly, the invention is a system for preventing a fault response by a protective relay in response to certain data conditions in the relay, comprising: means determining the difference between the magnitude of a sample of a power signal on a power line and the magnitude of a previous sample; means comparing said difference against a first threshold value; means for blocking the relay, i.e. the output contacts thereof, from initiating a fault response, such as by a signal to a circuit breaker, for a selected time portion of the power signal following determination that the first threshold has been exceeded by said difference; means for testing a selected characteristic of successive samples of the power signal, such as current magnitude, against a second selected threshold value, following determination that the first threshold has been exceeded by said magnitude difference; and means for unblocking the relay prior to the termination of said selected time portion if the characteristic is greater than the second threshold.

BRIEF DESCRIPTION OF THE DRAWINGS

The FIGURE shows a flow chart of the system of the present invention.

BEST MODE FOR CARRYING OUT THE INVENTION

Figure 1:
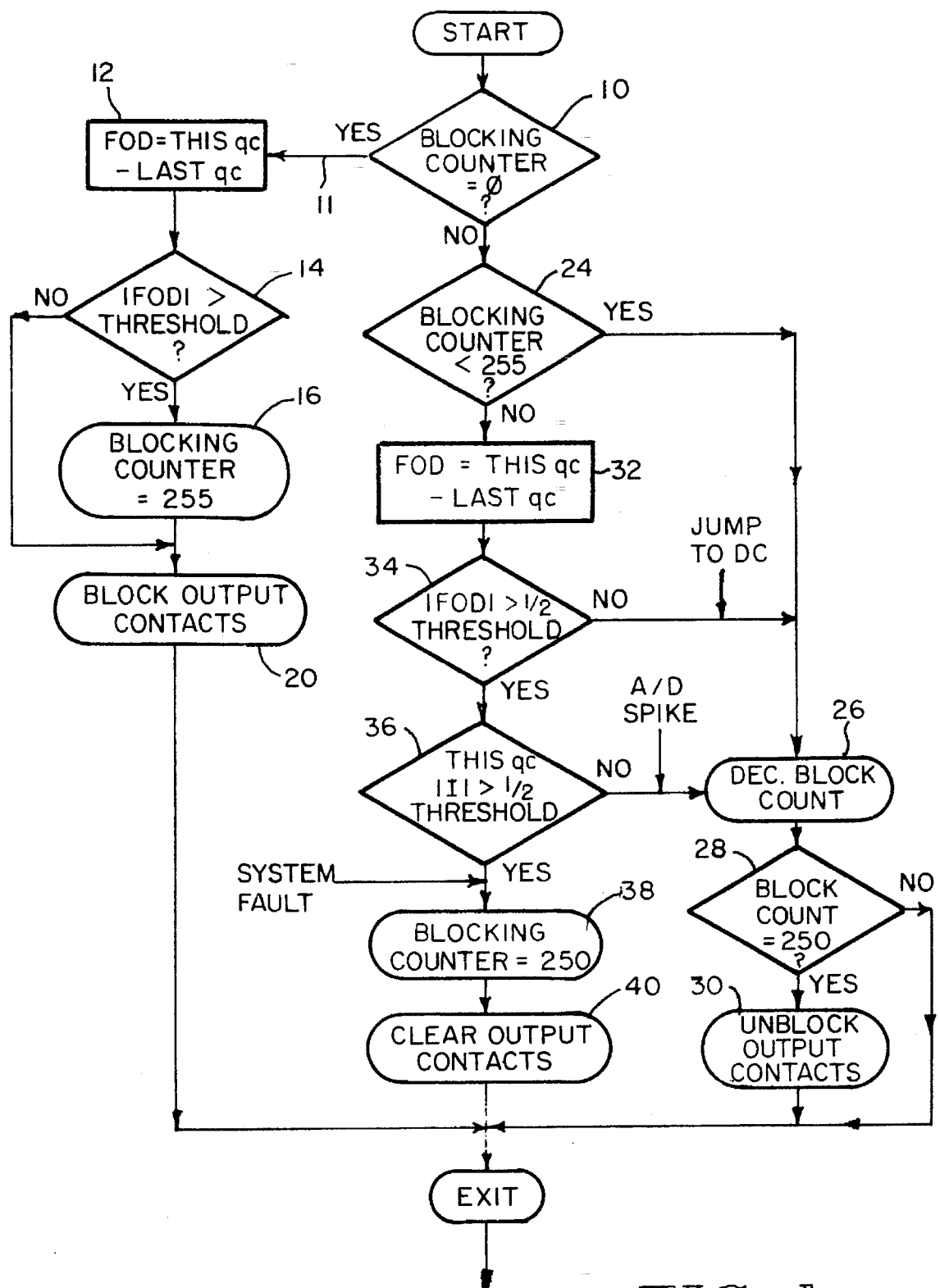

In the operation of a microprocessor-based computer relay for protecting power systems, current and voltage values of the power signal on the power line are applied to transformers, then to low pass filters, and then sampled at specific time intervals, i.e. one-quarter cycle. These sampled analog signals are then applied to a multiplexer and then an A/D converter, and then to a microprocessor to determine the presence of likely fault conditions, using selected comparison elements which evaluate various characteristics of the signals.

Occasionally, however, as indicated above, a malfunction occurs in the hardware elements of the relay which precede the microprocessor, such as in the A/D converter, resulting in either a temporary or on-going error in the output thereof. One malfunction results in a spike in the output. For example, while the normal current level at the secondary of the transformers is 5 amps, a spike might be as high as 50 amps. This large false current sample would of course be processed as if it were indicative of a spike in the current on the system, which in turn might be misinterpreted as a fault on the system. This spike information, if not detected as erroneous relative to the true system condition, could lead to a fault determination and a subsequent trip of a protective circuit breaker.

Since a trip will temporarily interrupt power to a particular portion of the power network, an incorrect trip will result in unnecessary inconvenience. Serious consequences of a power interrupt are also always possible. Hence, incorrect trips are to be avoided, if at all possible.

In another malfunction, the A/D converter will produce a straight DC output, referred to as a "jump to DC". This malfunction also has the potential of producing an emergency fault determination. Other malfunctions of the various hardware elements preceding the microprocessor may also produce erroneous fault determinations.

The system shown in the FIGURE is designed to identify in particular the A/D spike and the jump to DC conditions. The circuit of the FIGURE operates with samples of current from the power signal on the line. It should be understood, however, that voltage samples can be used as well. The system of the present invention includes a blocking counter which is initially set to zero, and a difference element which determines the difference between two selected instantaneous current values, i.e. two current samples, and comparators which compare the difference values with various threshold values.

In the present invention, samples of the current are taken at quarter-cycle intervals of the power signal. However, it should be understood that other sampling rates could be used.

As indicated above, a blocking counter 10 used in the system of the present invention is initially set to zero. In the first step of system operations, relative to a first immediate quarter cycle sample from the power system, blocking counter 10 is interrogated to determine whether it is equal to zero or not. If the blocking counter was previously set to zero, then there will be an output on the "yes" line 11. A signal on line 11 results in a calculation of the first order difference (FOD) between the instantaneous current sample of current for the immediate quarter cycle and the sample of current for the last previous quarter cycle. The first order difference calculator is shown at 12 in the FIGURE.

The resulting first order difference value is then applied to a first comparator 14, which compares the first order difference value from difference calculator 12 against a first selected threshold. If the first order difference is less than the selected threshold value, then the system is exited until the next quarter-cycle evaluation, without any action being taken. The first threshold value is typically set a substantial amount above the values of current normally expected. For instance, the current values at the secondaries of the relay transformers are normally approximately 5 amperes peak. The first threshold in the embodiment shown is set at 50 amperes, although other values indicative of a current spike could be used, such as for instance a value in the range of 10–100 amperes.

If the first order difference is greater than the first threshold, then the blocking counter 10 is set to 255, as shown at block 16 in the FIGURE. Two hundred and fifty-five is a somewhat arbitrary value, covering approximately one second in time. In the system of the present invention, setting the blocking counter 10 to a particular value will thereafter prevent further signals on line 11 for that number of quarter cycles so that no further detection of possible erroneous data is possible for that time period, beyond the immediate determination. Other time periods besides a 255 quarter cycle period (approximately one second) could be used. The time could certainly be longer since erroneous data conditions covered by this invention are quite infrequent.

When the blocking counter is set to 255, the output contacts of the relay are also blocked for five quarter cycles of the power signal, as shown by block 20. Thus, the outputs of the relay are prevented from operating, i.e. providing a trip signal, for up to five quarter cycles of the power signal, unless unblocked. The five quarter cycle time period is sufficient to permit the spike to propagate through the digital filters. It provides enough time to ensure that anomalous signals are due to a hardware element malfunction, as opposed to an actual fault, while at the same time minimizing the amount of time during which an actual fault on the line will not produce a trip signal.

For the next several quarter cycle samples of current, following the quarter cycle sample which resulted in the blocking counter 10 being set to 255, the blocking counter 10 is successively interrogated to determine whether it is at zero. For the very next sample, since the blocking counter is in fact at 255, the answer is "No" and the actual number in the counter is then compared against 255, as shown at block 24. If the number in counter 10 is less than 255 (which is true for the second quarter cycle sample after the quarter cycle which results in counter 10 being set to 255 and thereafter), the blocking counter 10 is decremented by one, as shown at block 26.

The new number is then compared against the number 250, at block 28, which is the number that the blocking counter is originally set to (255) minus the number of quarter cycles (5) that the output contacts are blocked. If the number in the blocking counter is greater than 250 (the "No" line in the FIGURE), then the system is exited until the next quarter cycle sample. If the number is 250 (the "Yes" line in the FIGURE), then the output contacts of the relay are unblocked, as shown at block 30. The relay then is able to produce a signal to trip the circuit breaker.

Returning to block 24, if the value in the blocking counter 10 is not less than 255, which would be the case for the quarter cycle sample following the quarter cycle sample which resulted in the blocking counter being set to 255, the first order difference is determined between the value of the current sample for that quarter cycle (the second quarter cycle) and the value of the current sample for the last previous quarter-cycle value (the first quarter cycle), as shown at block 32.

The first order difference value is then compared against one-half of the first threshold value, as shown at block 34. If the difference is less than one-half the threshold value, which will be true for a "jump to DC" condition since there is no change, i.e. no difference, between the first and second quarter-cycle samples, then the blocking counter 10 is decremented by one, at block 26. The resulting decremented number in the blocking counter is then interrogated at block 28, to determine whether it is equal to 250, and then the system is either exited or the output contacts unblocked.

If, on the other hand, the first order difference is greater than one-half the threshold value (the "Yes" line from block 34), then the magnitude of the current of the quarter cycle sample is tested to determine whether it is greater than one-half the first threshold, as shown in block 36. If the current is not greater than one-half the threshold, which would be true for an A/D converter spike condition, then the blocking counter 10 is decremented by one, and then that number is tested to determine whether it is equal to 250, with a subsequent exit from the system or an unblocking of the output contacts.

If, on the other hand, the current is greater than one-half the threshold (the "Yes" line from block 36), indicating a continuing large current, as opposed to a spike, then the blocking counter 10 is immediately set to 250, as shown at block 38, and the relay output contacts are then unblocked, as shown at block 40. The system is then exited; if the current value is indicative of a fault, as determined by the microprocessor, then a trip signal is produced for the circuit breaker. Hence, in the case of a system fault condition, the output contacts can be restored (unblocked) on the second quarter cycle, which is a fast recovery time and important to the system of the present invention.

For the next 250 quarter cycles, blocks 10, 24, 26 and 28 will be in operation, until the blocking counter 10 is decremented to zero, at which point the first order difference calculation at block 12 will again resume. As mentioned above, however, 250 is somewhat arbitrary and may be somewhat less or more.

Hence, a system has been described for use in protective relays which is capable of distinguishing certain erroneous data conditions, specifically an analog-to-digital converter spike and an analog-to-digital converter failure leading to a constant DC output. It accomplishes this without losing significant response time for true fault conditions.

Although a preferred embodiment has been described herein for purposes of illustration, it should be understood that various modifications and substitutions may be made without departing from the spirit of the invention which is defined by the claims which follow.

What is claimed is:

1. A system for preventing a fault response for certain data conditions occurring in a protective relay, comprising:

means determining the difference between the magnitude of a sample of a power signal on a power line and the magnitude of a previous sample;

means comparing said difference against a first threshold value;

means for blocking the relay from initiating a fault response for a preselected period of time if the first threshold value is exceeded by said difference;

means for testing a selected characteristic of successive samples of the power signal against a second threshold value during the preselected period of time, following determination that the first threshold value has been exceeded by said difference; and means for unblocking the relay prior to the termination of said preselected period of time if the selected characteristic is greater than the second threshold value.

2. A system of claim 1, wherein the previous sample is the last previous sample.

3. A system of claim 1, wherein said power signal samples are samples of current.

4. A system of claim 1, wherein said preselected period of time is five quarter cycles of the power signal.

5. A system of claim 1, wherein the relay is blocked for only approximately one-quarter cycle of the power signal if the selected characteristic is above the second threshold.

6. A system of claim 1, wherein the data condition is a constant DC output from an A/D converter portion of the protective relay and wherein the selected characteristic is the difference in magnitude between the sample resulting in the first threshold being exceeded and the next successive sample, and wherein the second threshold is approximately one-half of the first threshold.

7. A system of claim 1, wherein the samples of the power signal are taken at quarter cycle intervals.

8. A system of claim 1, wherein the data condition is a spike output from an A/D converter portion of the protective relay and wherein the selected characteristic is the magnitude of the current of the power signal and wherein the second threshold is approximately one-half of the first threshold.

9. A system of claim 1, wherein two selected characteristics of the power signal for said samples are tested against a second threshold in succession, wherein the first selected characteristic is the difference in magnitude between the sample resulting in the first threshold being exceeded and the next successive sample and wherein the second selected characteristic is the magnitude of the current of the power signal, and wherein the second threshold is approximately one-half of the first threshold.

10. A system of claim 1, including means for blocking further magnitude difference determinations for a particular time portion following the sample in which the first threshold is exceeded by a difference magnitude.

11. A system of claim 10 wherein the particular time portion is approximately 1 second.

12. A system of claim 1 wherein said preselected period of time is five quarter cycles of the power signal.

* * * * *